United States Patent Office 3,663,696
Patented May 16, 1972

3,663,696
TREATMENT OF DEPRESSION WITH 2-CHLORO-11 - (PIPERAZINYL)DIBENZ - [b,f][1,4]OXAZE-PINES AND ACID ADDITION SALTS THEREOF
Charles Frederick Howell, Upper Saddle River, and Robert Allis Hardy, Jr., Ridgewood, N.J., and Nicanor Quinones Quinones, New York, N.Y., assignors to American Cyanamid Company, Stamford, Conn.
No Drawing. Continuation-in-part of application Ser. No. 551,544, May 20, 1966, which is a continuation-in-part of application Ser. No. 348,271, Feb. 28, 1964. This application July 22, 1970, Ser. No. 57,307
Int. Cl. A61k 27/00
U.S. Cl. 424—250       8 Claims

ABSTRACT OF THE DISCLOSURE

The preparation of 2-chloro-11-(1-piperazinyl)dibenz-[b,f][1,4]oxazepine by heating ethyl 4-{[o-(p-chlorophenoxy)phenyl]carbamoyl}-1-piperazine carboxylate with phosphorus pentoxide and phosphorus oxychloride, is described. The base compound and pharmacologically acceptable acid addition salts are useful for their anti-depressant effect on the central nervous system of warm-blooded animals.

---

This application is a continuation-in-part of our co-pending application Ser. No. 551,544, filed May 20, 1966, now abandoned which in turn is a continuation-in-part of application Ser. No. 348,271, filed Feb. 28, 1964, now abandoned.

This invention relates to a novel pharmaceutical composition. More particularly, it is concerned with a novel pharmaceutical composition and method of utilization to produce a therapeutically desirable effect for the treatment of depressive states.

The present invention comprises a pharmaceutical composition containing as an active anti-depressant agent a compound of the formula:

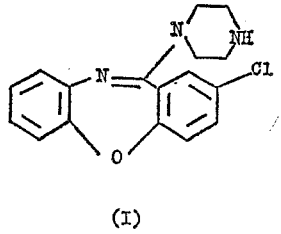

(I)

and pharmacologically acceptable acid addition salts thereof.

The 2-chloro-11-(1-piperazinyl)dibenz[b,f][1,4]oxazepines (I) or salts as the active ingredients of the compositions of the present invention have been found to be highly active anti-depressant agents in warm-blooded animals. They show excellent anti-depressant action over a wide range of doses which are non-toxic and which do not produce undesirable symptoms. The anti-depressant properties of the compositions of the present invention are determined in several ways. For example, they readily counteract the depression induced in animals by the administration of tetrabenazine hexamate. Graded doses of the active compounds of this invention are administered to groups of mice, and this is followed by administering a dose of tetrabenazine which is known to markedly depress the exploratory behavior of normal mice. The anti-depressant treated groups show normal exploratory behavior, while the control groups, and groups treated with an ineffective anti-depressant agent, do not show this normal exploratory behavior, but show the well known profound depression induced by tetrabenazine. The results from several dose levels are used to establish effective dose ranges. The anti-depressant compounds of this invention show their desirable properties by this procedure at dose levels which produce no overt signs of stimulation or depression. These anti-depressant properties are, furthermore, evident at non-toxic dose levels.

When tested by these procedures, the novel base compound of the present invention shows anti-depressant activity in warm-blooded animals in the range of 0.4 to 50 mg./kg. when administered intraperitoneally to mice, and has a duration of action which lasts at least 6 hours. It is also active at 0.2 to 25 mg./kg. when administered orally. The lethal dose ($LD_{50}$) in warm-blooded animals such as mice is 122 mg./kg., administered intraperitoneally and 112 mg./kg. when administered orally, and this drug shows a wide margin of safety ($LD_{50}$/lowest active dose vs. tetrabenazine is 305, intraperitoneally; and 560, orally). The results of the present compounds and a known homologue in the above test are summarized in the following table:

TABLE

Reversal of tetrabenazine hexamate depression
Compound:

| | |
|---|---|
| I | 0.4–50 |
| II | 0.6–25 |
| III | 1.6–25 |
| IV | 0.8–25 |
| V | 3.1–25 |
| VI | {1 / 2} |

[1] Rejected at —25 mg./kg.
[2] Rejected at —0.2 mg./kg.

NOTE.—Compound I=2-chloro-11 - (1 - piperazinyl)-dibenz-[b,f][1,4]oxazepine, melting point 175–176° C.; Compound II=2-chloro-11-(1-piperazinyl)-dibenz[b,f][1,4]oxazepine fumarate, melting point 204–206° C.; Compound III=2-chloro-11-(1-piperazinyl)-dibenz[b,f][1,4]oxazepine maleate, melting point 195–200° C. (decomposition); Compound IV=2-chloro-11-(1-piperazinyl)-dibenz[b,f][1,4]oxazepine succinate, melting point 180–181° C.; Compound V=2-chloro-11-(1-piperazinyl)-dibenz[b,f][1,4]oxazepine diheptanoate, melting point 82° C.; Compound VI=2-chloro-11 - (4 - methyl - 1 - piperazinyl)-dibenz[b,f][1,4]oxazepine, melting point 109–111° C.

In addition, the compounds of the present invention show other antidepressant actions. For example, the base compound of this invention inhibits and reverses the hypothermic response to reserpine and enhances the lethal effect of yohimbine. This compound also prolongs the pressor response to norepinephrine and blocks phenethylamine.

A major difference between the base compound of this invention and a standard anti-depressant agent, imipramine, is that the base compound of this invention appears to be devoid of anticholinergic actions. In addition, the base compound of this invention does not demonstrate a biphasic response in its action as an inhibitor of tetrabenazine depression (i.e., no activity at high or depressant doses) as is found with imipramine. With the base compound of this invention this activity is present even at marked depressant doses; furthermore, this compound is not an anticonvulsant. On the basis of these findings it is expected that the dryness of the mouth, palpitations, blurred vision and urinary retention associated with the clinical use of a standard anti-depressive agent such as imipramine may be absent with the administration of the base compound of this invention.

Detailed safety evaluation studies in rats in daily doses of from 50 to 400 mg./kg. and dogs in daily doses of 1.5 to 6 mg./kg. including oral dosing for periods of 90 days to 1 year and longer, have shown no deleterious effects on gross or microscopic morphological examination that could be attributed to the long term administration of the base compound of this invention.

The base compound of this invention is a nearly colorless crystalline solid only slightly soluble in water, but readily soluble in organic solvents such as methanol, ethanol and paraffin hydrocarbons. It is a basic substance which is soluble in aqueous acids at room temperature. It forms substantially non-toxic insoluble acid addition salts such as the hydrochloride, sulfate, phosphate, citrate, tartrate, maleate, fumarate, etc. The present compound, generally in the form of its salts, may be administered orally or parenterally and when so administered, produces a therapeutically desirable effect for the treatment of depressive states.

A wide range of doses may be employed. Individual doses may range from about 1 to about 150 mg., and a preferred range is from about 1 to about 50 mg. The dosage range is adjusted to provide an optimum therapeutic response, in the warm-blooded animal being treated. Thus, for example, several doses may be administered daily, or the dose may be reduced proportionately as indicated by the exigencies of the therapeutic situation. The daily dosage range is from about 0.1 to about 10 mg./kg. with a preferred range, in many warm-blooded animals of about 1 to about 6 mg./kg.

For therapeutic administration the active dibenzoxazepine, or salt, of this invention may be incorporated with excipients and used, for example, in the form of tablets, dragées, capsules, suppositories, liquids, elixirs, emulsions, suspensions, syrups, chocolate, candy, wafers, chewing gum, solutions for parenteral administration, or the like. Such compositions and preparations should contain at least 0.1% of active dibenzoxazepine or salt. The percentage in the compositions and preparations may, of course, be varied, and may conveniently be between about 2% and 60% or more of the weight of the unit. The amount of active dibenz-oxazepine, or salt, in such therapeutically useful anti-depressant compositions or preparations is such that a suitable dosage will be obtained. This dosage can also be obtained by the use of sustained release preparations. Preferred compositions or preparations according to the present invention are prepared so that a dosage unit form contains between about 1 and about 50 milligrams of the active dibenzoxazepine or salt.

Tablets, pills, dragées, and the like may contain the following: a binder such as gum tragacanth, acacia, corn starch, or gelatin. A disintegrating agent such as corn starch, potato starch, alginic acid, or the like. A lubricant such as stearic acid, magnesium stearate, talc, or the like. A sweetening agent such as sucaryl or saccharin may be added, as well as a flavoring such as peppermint, oil of wintergreen or cherry flavoring.

The new 2-chloro-11-(1-piperazinyl)dibenz[b,f][1,4]-oxazepine of this invention may be prepared by a number of methods. One method is illustrated as follows:

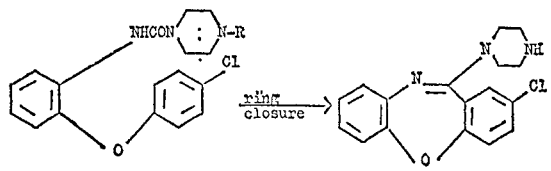

II        I wherein R is hydrogen, carboalkoxy, carbobenzoyloxy, or benzyl. By this method, a 1 - {[o - (p - chlorophenoxy) phenyl]carbamoyl} - 4 - substituted-(R)-piperazine (II) is treated with a condensing agent such as phosphorus oxychloride, phosphorus pentachloride, polyphosphoric acid, zinc chloride, aluminum chloride and the like in the presence of an inert solvent. When blocking groups such as carbethoxy and the like (R) are present in the uncyclized intermediates (II), the conditions for the ring closure reaction and the subsequent isolation procedures are such that these groups are frequently hydrolyzed to the desired 4-H-piperazine compound of this invention without further treatment. Alternately, such blocking groups (including carboalkoxy, carbobenzyloxy and benzyl) may be removed as a final step by methods well known to those skilled in the art, or the intermediate (II) wherein R is hydrogen may be cyclized directly.

SPECIFIC DESCRIPTION

The following examples describe in detail the synthesis of the base compound and salts and formulations of various types of pharmaceutical preparations.

Example 1.—Preparation of 2-chloro-11-(1-piperazinyl) dibenz[b,f][1,4]-oxazepine and salts A mixture of 125 g. of o-(p-chlorophenoxy)aniline hydrochloride and 100 ml. of dry pyridine is treated cautiously with a solution of 90 ml. of ethyl chlorocarbonate in 150 ml. of ether. The mixture is kept at room temperature for 3 days, diluted with about 500 ml. of water and extracted with 300 ml. of ether. The ethereal extract is washed with 300 ml. of water, dried over calcium chloride, filtered and concentrated. The resulting ethyl o-(p-chlorophenoxy)carbanilate is obtained in a viscous oil suitable for use in the next step without further purification.

A solution of 70 g. of ethyl o-(p-chlorophenoxy)carbanilate and 120 g. of N-carbethoxypiperazine in 100 ml. of benzene containing a little sodium methoxide is heated on a steam bath for about 5 days. The solvent is removed by distillation and the residue is triturated with water. The resulting solid is dissolved in ether and dried over sodium sulfate. Filtration and concentration then yields ethyl 4-{[o - (p-chlorophenoxy)phenyl]carbamoyl}-1-piperazinecarboxylate, melting at 89–91° C., and suitable for cyclization.

A mixture of 10 g. of the above piperazine carboxylate ester, 8 g. of phosphorus pentoxide and 20 ml. of phosphorus oxychloride is heated under reflux for about 1 day, diluted with 100 ml. each of chloroform and benzene and quenched with 200 g. of ice. The mixture is made basic with 10% sodium hydroxide. The organic layer is isolated and extracted with 150 ml. of dilute hydrochloric acid. The product is precipitated from the aqueous layer by addition of 10% sodium hydroxide, extracted with benzene and dried over potassium carbonate. Recrystallization from benzene-petroleum ether gives 2-chloro-11-(1-piperazinyl)dibenz[b,f][1,4]oxazepine which melts at 175–176° C.

The above free base is dissolved in ethyl acetate, and a solution of fumaric acid in ethyl acetate is added, to give 2 - chloro-11-(1-piperazinyl)dibenz[b,f][1,4]oxazepine fumarate.

The above free base is dissolved in ether and the theoretical amount of alcoholic hydrogen chloride is added. The compound 2 - chloro-11-(1-piperazinyl)dibenz[b,f] [1,4]oxazepine hydrochloride is obtained.

The above free base is dissolved in ethyl acetate and a solution of sulfuric acid in ethyl acetate is added, to give 2 - chloro - 11 - (1 - piperazinyl)dibenz[b,f][1,4]oxazepine sulfate. Other salts were prepared in a similar manner and some are shown in the table hereinbefore.

Example 2.—Preparation of 25 mg. tablets

|  | Per tablet, grams | For 10,000 tablets, grams |
|---|---|---|
| Active ingredient: 2-chloro 11-(1-piperazinyl) dibenz-[b,f][1,4] oxazepine | 0.025 | 250 |
| Lactose | 0.080 | 800 |
| Corn starch (for mix) | 0.010 | 100 |
| Corn starch (for paste) | 0.008 | 75 |
| Total | 0.123 | 1,225 |
| Magnesium stearate (1%) | 0.001 | 10 |
| Grand total | 0.124 | 1,235 |

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a #8 hand screen and dried at 120° F. The dry granules are then passed through a #16 screen. The mixture is lubricated with 1% magnesium stearate and compressed into tablets in a suitable tableting machine.

Example 3.—Preparation of 10 mg. tablets

|  | Per tablet, grams | For 10,000 tablets, grams |
|---|---|---|
| Active ingredient: 2-chloro-11-(1-piperazinyl) dibenz-[b,f][1,4] oxazepine | 0.010 | 100 |
| Lactose | 0.080 | 800 |
| Corn starch (for mix) | 0.015 | 150 |
| Corn starch (for paste) | 0.010 | 100 |
| Total | 0.115 | 1,150 |
| Magnesium stearate (1%) | 0.001 | 12 |
| Grand total | 0.116 | 1,162 |

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a #8 hand screen and dried at 120° F. The dry granules are then passed through a #16 screen. The mixture is lubricated with 1% magnesium stearate and compressed into tablets in a suitable tableting machine.

Example 4.—Preparation of 50 mg. tablets

|  | Per tablet, grams | For 10,000 tablets, grams |
|---|---|---|
| Active ingredient: 2-chloro-11-(1-piperazinyl) dibenz-[b,f][1,4] oxazepine | 0.050 | 500 |
| Lactose | 0.080 | 800 |
| Corn starch (for mix) | 0.010 | 100 |
| Corn starch (for paste) | 0.008 | 75 |
| Total | 0.148 | 1,475 |
| Magnesium stearate (1%) | 0.002 | 15 |
| Grand total | 0.150 | 1,490 |

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a #8 hand screen and dried at 120° F. The dry granules are then passed through a #16 screen. The mixture is lubricated with 1% magnesium stearate and compressed into tablets in a suitable tableting machine.

Example 5.—Preparation of oral syrup

Ingredient: Amount
  Active ingredient: 2-chloro-11-(1-piperizinyl)di-
    benz[b,f][1,4]oxazepine, mg. _____ 500
  Sorbitol solution (70% N.F.), ml. _____ 40
  Sodium benzoate, mg. _____ 150
  Saccharin, mg. _____ 10
  Red dye (F.D. & C. No. 2), mg. _____ 10
  Cherry flavor, mg. _____ 50
  Distilled water, q.s. ad 100 ml.

The sorbitol solution is added to 40 ml. of distilled water and the active ingredient is suspended therein. The saccharin, sodium benzoate, flavor and dye are added and dissolved in the above solution. The volume is adjusted to 100 ml. with distilled water. Each ml. of syrup contains 5 mg. of drug.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dye may be used in place of those listed above.

Example 6.—Preparation of parenteral solution

In a solution of 700 ml. of propylene glycol and 200 ml. of water for injection is dissolved 20.0 g. of 2-chloro-11-(1-piperazinyl)dibenz[b,f][1,4]oxazepine with stirring. After dissolution is complete, a solution of 2.5 g. of ascorbic acid in 20 ml. of water for injection is then added to the formulation. The pH of this solution is then adjusted to 5.5 with hydrochloric acid and the volume is made up to 1000 ml. with distilled water. The formulation is filtered through a 0.22 micron sterilizing filter, filled into 5.0 ml. ampoules each containing 2.0 ml. (representing 40 mg. of drug) and sealed under nitrogen.

Example 7.—Preparation of lyophilized parenteral formulation

The pH of a stirred mixture of 20.0 g. of 2-chloro-11-(1-piperazinyl)dibenz[b,f][1,4]oxazepine and 900 ml. of water for injection is maintained at 3.5 by the addition of hydrochloric acid until the solid has dissolved. Mannitol (27 g.) is added and dissolved and the volume is made up to 1000 ml. with water for injection. After the solution is sterilized by passage through a 0.22 micron filter, it is filled in 5.0 ml. portions into 10 ml. vial and lyophilized. To reconstitute, 5.0 ml. of water for injection is added to a vial, giving a solution which is stable for at least 24 hours.

We claim:

1. A process for the therapeutic treatment of depression in a warm-blooded animal which comprises administering internally to said warm-blooded animal an effective amount of a compound selected from the group consisting of 2-chloro-11-(1-piperazinyl)dibenz[b,f][1,4]oxazepine and a pharmacologically acceptable acid-addition salt thereof in association with a pharmaceutical carrier to provide daily dosage of from about 0.1 to about 10 milligrams per kilogram of body weight of the warm-blooded animal.

2. The process of producing a therapeutically desirable effect on the central nervous system of a warm-blooded animal for the therapeutic treatment of depression which comprises administering internally to a warm-blooded animal a composition containing between about 1 and 50 milligrams per dosage unit of a compound selected from the group consisting of 2-chloro-11-(1-piperazinyl)dibenz[b,f][1,4]-oxazepine of the formula:

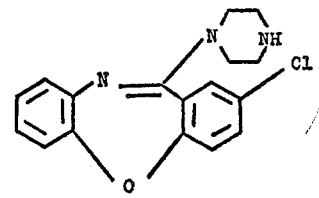

and a non-toxic acid-addition salt thereof and a pharmaceutically acceptable carrier therefor.

3. The process according to claim 1, in which the compound is 2-chloro-11-(1-piperazinyl)dibenz[b,f][1,4]oxazepine.

4. The process according to claim 1, in which the compound is 2-chloro-11-(1-piperazinyl)dibenz[b,f][1,4]oxazepine hydrochloride.

5. The process according to claim 1, in which the compound is 2-chloro-11-(1-piperazinyl)dibenz[b,f][1,4]oxazepine fumarate.

6. The process according to claim 1, in which the compound is 2-chloro-11-(1-piperazinyl)dibenz[b,f][1,4]oxazepine sulfate.

7. The process according to claim 1, in which the compound is 2-chloro-11-(1-piperazinyl)dibenz[b,f][1,4]oxazepine diheptanoate.

8. The process according to claim 1, in which the compound is 2-chloro-11-(1-piperazinyl)dibenz[b,f][1,4]oxazepine succinate.

References Cited

UNITED STATES PATENTS 3,412,193  11/1968  Coppola _____ 424—250

STANLEY J. FRIEDMAN, Primary Examiner